United States Patent [19]

Bykhovsky et al.

[11] 4,392,047
[45] Jul. 5, 1983

[54] NON-CONSUMABLE ELECTRODE

[76] Inventors: David G. Bykhovsky, ulitsa Esenina, 32, korpus 2, kv. 35; Albert A. Voropaev, ulitsa Manchesterskaya, 12, kv. 40; Evgeny F. Olennikov, ulitsa Ziny Portnovoi, 1, kv. 80; Alla V. Lopatina, prospekt Veteranov, 112, kv. 69, all of Leningrad, U.S.S.R.

[21] Appl. No.: 231,464

[22] Filed: Feb. 4, 1981

[30] Foreign Application Priority Data

May 14, 1982 [SU] U.S.S.R. ............................. 2916099
May 14, 1982 [SU] U.S.S.R. ............................. 2916100

[51] Int. Cl.³ .......................................... B23K 35/04
[52] U.S. Cl. ................................. 219/145.21; 219/75; 219/146.21
[58] Field of Search ................. 219/75, 145.21, 146.21

[56] References Cited

U.S. PATENT DOCUMENTS

| 3,086,103 | 4/1963 | Hackman et al. | 219/145.21 X |
| 3,214,623 | 10/1965 | Sheer | 219/75 X |
| 3,376,468 | 4/1968 | Hirt et al. | 219/75 X |
| 3,450,926 | 6/1969 | Kiernan | 219/75 X |
| 3,504,219 | 3/1970 | Gejo et al. | 219/145.21 X |
| 3,639,161 | 2/1972 | Trattner et al. | 219/146.21 X |
| 3,684,911 | 8/1972 | Perugini et al. | 219/75 X |
| 4,213,027 | 7/1980 | Bykhovsky et al. | 219/75 |
| 4,242,562 | 12/1980 | Karinsky et al. | 219/75 X |

FOREIGN PATENT DOCUMENTS

| 2755213 | 6/1979 | Fed. Rep. of Germany | 219/146.21 |
| 656781 | 4/1979 | U.S.S.R. | 219/145.21 |

*Primary Examiner*—R. R. Kucia
*Attorney, Agent, or Firm*—Burgess, Ryan and Wayne

[57] ABSTRACT

A non-consumable electrode for use in arc and plasma devices in an inert gas atmosphere comprising a holder and an active portion made of a refractory metal with emission admixtures, the active portion being connected with the holder so that its outer side surface is exposed to a height exceeding ¼ of a diameter thereof.

31 Claims, 4 Drawing Figures

NON-CONSUMABLE ELECTRODE

FIELD OF THE INVENTION

The invention relates to electrodes, and more specifically to non-consumable electrodes for arc and plasma treatment in an inert gas atmosphere.

The present invention can most successfully be used for arc and plasma welding and melting of metals and as cathodes for gas-discharge apparatus.

BACKGROUND OF THE INVENTION

To prolong the operating life of an electrode and to extend the range of operating currents within which stabilization of the electric arc and its space localization are provided, it is necessary that in the course of pretreatment of non-consumable electrodes according to a method disclosed in Swedish Pat. No. 397,765 formation of the work surface of the electrode is accomplished by conversion of the electrode material from a liquid phase to a solid one.

The formation of the work surface of the electrode is achieved only if two phases are simultaneously present thereon, that is a liquid and solid phase with conversion of the material of the active portion of the electrode from a liquid phase to a solid one.

Known to the prior art is a non-consumable electrode comprising a holder having a recess formed in the work end thereof, fixed in the holder is an active portion in contact with the bottom and side surface of the recess. The height of the active portion is lower than that of the recess wherein this active portion is fixed (Cf. U.S. Pat. No. 3,307,011).

This electrode has a narrow operating current range. An operating current range is a range from a minimum current $I_{min}$ to a maximum one $I_{max}$ which provides the following:

(1) stabilization of an arc and its spaced localization within the entire range of current control so that the operating current can be varied repeatedly in both ways, that is increased from $I_{min}$ to $I_{max}$ and decreased from $I_{max}$ to $I_{min}$;

(2) arc striking at any current value in the range from $I_{min}$ to $I_{max}$ inclusive;

(3) a low cathode voltage drop; and (4) a low value of heat flow into the electrode.

The ratio between the lower limit of current to the upper limit thereof within the entire range of control is at best 1:5 for this electrode.

In the course of operation of this electrode the inner surface of the recess is destroyed because of arcing between the workpiece and the recess.

Besides, in the course of pretreatment of this electrode according to a method disclosed in Swedish Pat. No. 397,765 formation of the work surface of the active portion does not occur since the material of the active portion of the electrode is in a liquid phase.

Also known in the prior art is a non-consumable electrode for arc processes (Cf. U.S. Pat. No. 3,198,932), comprising a holder having a recess formed in the work end thereof. Fixed in the recess is an active portion flush with the surface of the work end of the holder, i.e. the height of the active portion is equal to that of the recess.

Since the height of the active portion in this electrode is equal to that of the recess, the inner surface of the recess is not destroyed in the course of operation of the electrode.

However, this electrode has a narrow range of current control within which arc stabilization is provided.

In the course of pretreatment of this electrode according to a method disclosed in Swedish Pat. No. 397,765 formation of the work surface of the active portion does not occur since the thermal state of the electrode does not provide conditions for the formation of a solid phase on the work surface of the electrode.

Also known in the prior art is a non-consumable electrode, primarily a cathode, for arc processes (Cf. U.S. Pat. No. 3,911,309) comprising a holder having a recess formed in the work end thereof, fixed in which is an active portion. The height of the active portion is greater than that of the recess, i.e. the work zone of the active portion extends beyond the holder.

In the course of pretreatment of this electrode according to a method disclosed in Swedish Pat. No. 397,765 formation of the work surface of the active portion is accomplished due to partial conversion of the material from a liquid phase to a solid one.

Insufficient formation of the work surface of the active portion of the electrode makes is impossible to extend the range of operating currents within which the stabilization of an electric arc and its space localization are provided.

Also known in the prior art is a non-consumable electrode for arc processes (Cf. U.S. Pat. No. 3,231,332) representing a rod holder with an active portion made as a core. The holder is made of tungsten, and the active portion is made of emission materials. It is possible to use various admixtures added to tungsten to improve its plasticity, but they do not affect the electron-emitting properties of the electrode. The active portion is made of electron-emission materials, such as thorium oxide, lanthanum oxide, and the oxides of other rare-earth materials, and has a lower operating performance than that of the outer layer.

This electrode operates in the range of currents not lower than 20A, the stabilization of an electric arc and its space localization being provided only with the increase of current intensity.

Besides, this electrode has rather narrow application potentialities due to the fact that the electric arc stabilization with current control in either direction is maintained within a very narrow range of currents, and the space instability of the electric arc makes it impossible to use such electrodes for welding of closely spaced ribs, edges, etc.

Furthermore, the space stability of the electric arc is disturbed after the expiration of time defined by the operating life of the electrode. The description the patent teaches that to restore the electrode, it should be sharpened. The upper portion of the electrode made of tungsten is removed until the active core of the electrode with a new reserve of emission materials is exposed. The electrode should be resharpened, which, requires special tools and, results in a substantial waste of scarce tungsten from which the holder is made.

This electrode is characterized by a high cathode voltage drop and cannot provide stable arc striking at low currents.

SUMMARY OF THE INVENTION

It is an object of the present invention to provide a non-consumable electrode for arc and plasma treatment in an inert gas atmosphere with formation of a work surface which provides for a broad range of operating currents with the improved stabilization of the electric arc and its space localization within the entire range of current control.

Another object of the present invention is to reduce the cathode voltage drop.

Still another object of the present invention is to provide for electric arc striking at any current value within the entire range of control.

Still also another object of the present invention is to reduce the cost of the non-consumable electrode.

Yet another object of the present invention is to reduce the heat flow into the electrode.

With these and other objects in view there is provided a non-consumable electrode for arc and plasma treatment in an insert gas atmosphere, comprising a holder and an active portion of a refractory metal with emission admixtures, wherein, according to the invention, the active portion is connected with the holder so that its outer side surface is exposed to a height exceeding ¼ of a diameter thereof.

Such a connection of the active portion with the holder makes it possible to obtain simultaneously liquid and solid phases on the surface of the active portion, which provides for the formation of the emitting work surface of the electrode.

Formation of the emitting work surface of the electrode permits a significant reduction of tungsten expenditure in electrodes operating in the medium and large current range by substituting titanium for the same purpose.

The formation of the active portion of the electrode encourages a substantial increase in emission activity, a decrease of the work function of electrons, and localization of a cathode spot and makes it possible to extend appreciably the range of operating currents, to reduce heat losses in the electrode, and to decrease the cathode voltage drop.

If the outer side surface of the active portion of the electrode is exposed to a height smaller than ¼ of its diameter, the material of the active portion is in a liquid phase, the formation of the work surface of the active portion does not occur, and the non-consumable electrode cannot provide the extended range of operating currents with improvement in stabilization of the electric arc and its space localization.

A preferred embodiment of the invention is to make the active portion of the non-consumable electrode from powder in which tungsten is used as a refractory metal in amounts of from 65 to 95% by weight and taken as the emission admixtures are rare-earth metals or their compounds.

As used herein all percentages are by weight unless otherwise noted.

The studies of tungsten content in the powder have shown that an optimal tungsten content is from 60 to 95% by weight.

A decrease of tungsten content in the powder below 60% by weight results in deterioration of the thermal conduction of the electrode and in conversion of the material of the work surface of a liquid phase. With the reduction of tungsten content there is no formation of the active portion.

With an increase of tungsten content in the powder above 95% the content of rare-earth metals is reduced below 5%, which results in deterioration of the emission properties of the active portion and causes a rise of the cathode voltage drop.

According to the invention, it is preferred to use yttrium in amounts of 5 to 40% as a rare-earth metal in the non-consumable electrode with the active portion made of a powder in which tungsten is used as a refractory metal in amounts of 60 to 95%.

According to the invention, it is also preferred to use yttrium compounds in amounts of 5 to 40% as rare-earth metal compounds in the non-consumable electrode with the active portion made of a powder in which tungsten is used as a refractory metal in amounts of 60 to 95%.

According to the invention, it is also preferred to use gadolinium in amounts of 10 to 35% as a rare-earth metal in the non-consumable electrode with the active portion made of the powder in which tungsten is used as a refractory metal in amounts of 65 to 90%.

According to the invention, it is also preferred to use gadolinium compounds in amounts of 10 to 35% as rare-earth metal compounds in the non-consumable electrode with the active portion made of a powder in which tungsten is used as a refractory metal in amounts of 65 to 90%.

According to the invention, a preferred embodiment is to use a mixture of yttrium and gadolinium as rare-earth metals in the non-consumable electrode with the active portion made of a powder in which tungsten is used as a refractory metal in amounts of 60 to 95%, the relation between the components in percent by weight being as follows:

| | |
|---|---|
| yttrium | 5–15 |
| gadolinium | 10–25 |

According to the invention, a preferred embodiment is to use a mixture of yttrium compounds and gadolinium compounds as rare-earth metal compounds in the non-consumable electrode with the active portion made of the powder in which tungsten is used as a refractory metal in amounts of 65 to 90%, the relation between the components in percent by weight being as follows:

| | |
|---|---|
| yttrium compounds | 7–20 |
| gadolinium compounds | 12–35 |

A decrease or increase in the amount of rare-earth metals or their compounds below or above said limits narrows the range of operating currents and affects the stabilization of the electric arc and its space localization within the entire range of operating current control.

A preferred embodiment of the invention is to make the active portion of the non-consumable electrode from a powder in which titanium is used as a refractory metal in amounts of 70 to 99.5% and rare-earth metals or their compounds are used as emission admixtures.

The use of titanium as a refractory material for the active portion makes it possible to reduce the cost of the electrode and to simplify its fabrication.

It is preferred, according to the invention, to use cerium in amounts of 0.5 to 4% as a rare-earth metal in the non-consumable electrode with the active portion made of a powder in which titanium is the refractory metal.

It is also preferred, according to the invention, to use cerium compounds in amounts of 0.5 to 5% as rare-earth metal compounds in the non-consumable electrode with the active portion made of a powder in which titanium is the refractory metal.

Another preferred embodiment, according to the invention is to use dysprosium in amounts of 0.5 to 5% as a rare-earth metal in the non-consumable electrode with the active portion made of a powder in which titanium is the refractory metal.

A preferred embodiment, according to the invention, is to use disprosium compounds in amounts of 0.5 to 5% as rare-earth metal compounds in the non-consumable electrode with the active portion made of a powder in which titanium is the refractory metal.

Another preferred embodiment, according to the invention, is to use gadolinium in amounts of 1 to 10% as a rare-earth metal in the non-consumable electrode with the active portion made of a powder in which titanium is the refractory metal.

It is also preferred, according to the invention, to use gadolinium compounds in amounts of 10 to 30% as rare-earth metal compounds in the non-consumable electrode with the active portion made of a powder in which titanium is the refractory metal.

Another preferred embodiment, according to the invention, is to use neodymium in amounts of 1 to 8% as a rare-earth metal in the non-consumable electrode with the active portion made of a powder in which titanium is the refractory metal.

It is also preferred, according to the invention, to use neodymium compounds in amounts of 1 to 8% as rare-earth metal compounds in the non-consumable electrode with the active portion made of a powder in which titanium is the refractory metal.

According to the invention, it is also preferred to use terbium in amounts of 0.5 to 5%, as a rare-earth metal, in the non-consumable electrode with the active portion made of a powder in which titanium is the refractory metal.

According to the invention, it is also preferred to use terbium compounds in amounts of 0.5 to 5%, as rare-earth metal compounds, in the non-consumable electrode with the active portion made of a powder in which titanium is the refractory metal.

A preferred embodiment, according to the invention, uses praseodymium in amounts of 0.5 to 2%, as a rare-earth metal, in the non-consumable electrode with the active portion made of a powder in which titanium is the refractory metal.

It is also preferred, according to the invention, to use praseodymium compounds in amounts of 0.5 to 2% as rare-earth metal compounds in the non-consumable electrode with the active portion made of a powder in which titanium is the refractory metal.

A reduction in the amount of rare-earth metals or their compounds in the composition of the powder used to fabricate the active portion of the electrode, in which titanium is used as a high-melting metal, below said limits results in a sharp decrease in the operating life of the non-consumable electrode due to degradation of its emission properties.

An increase in the amount of rare-earth metals or their compounds in the composition of the powder used to fabricate the active portion of the electrode, in which titanium is used as a high-melting metal, above said limits results in a substantial degradation of physico-thermal properties of the active portion of the electrode and, in particular, in a reduction of the melting point of the electrode and in the degradation of the formation of the work surface, which in turn reduces the operating life of the electrode.

Depending on the amount of rare-earth metals or their compound in the electrode, the amount of titanium in the active portion varies from 70 to 99.5%.

It is also preferred to make the active portion of the non-consumable electrode from an alloy in which the base metal is a refractory metal of Group IV A of the periodic system and taken as emission admixtures are rare-earth metals or their compounds.

The use of alloys instead of pressed powder mixtures makes it possible to reduce the amount of gas and other harmful impurities in the electrode. The gases and impurities result in instability of physico-mechanical properties of the electrode. Making the active portion of the electrode from an alloy makes it possible to improve the physico-mechanical properties of the electrode and to prolong the operating life of the electrode.

It is preferred, according to the invention, to use titanium in amounts of 90 to 99.5% as a base metal in the non-consumable electrode with the active portion made of an alloy.

It is also preferred, according to the invention, to use zirconium in amounts of 90 to 99.5% as a base metal in the non-consumable electrode with the active portion made of an alloy.

It is preferred, according to the invention, to use gadolinium in amounts of 0.5 to 10% as a rare-earth metal in the non-consumable electrode when the active portion is made of an alloy.

It is preferred, according to the invention, to use cerium in amounts of 0.5 to 5% as a rare-earth metal in the non-consumable electrode when the active portion is made of an alloy.

It is also preferred, according to the invention, to use cerium compounds in amounts of 0.5 to 5% as rare-earth metal compounds in the non-consumable electrode when the active portion is made of an alloy.

A reduction of the content of rare-earth metals or their compounds in the alloy below 0.5% results in the degradation of the emission properties of the electrode, which in turn results in a decrease in the operating life of the electrode.

The increase in the content of rare-earth metals or their compounds in the alloy above said limits results in the degradation of physico-thermal properties, such as in the decrease of the melting point of the active portion, as a result of which the operating life of the non-consumable electrode is reduced.

The aforementioned and other objects and advantages of the present invention will become more apparent upon consideration of the following detailed description of its embodiments taken in conjunction with the accompanying drawings in which:

BRIEF DESCRIPTION OF THE ACCOMPANYING DRAWINGS

FIG. 1 schematically shows a longitudinal section of a non-consumable electrode, according to the invention;

FIG. 2 schematically shows a longitudinal section of another embodiment of a non-consumable electrode, according to the invention;

FIG. 3 schematically shows a longitudinal section of still another embodiment of a non-consumable electrode, according to the invention; and FIG. 4 schematically shows a longitudinal section of yet another embodiment of a non-consumable electrode, according to the invention.

DESCRIPTION OF A PREFERRED EMBODIMENT

A non-consumable electrode comprises a holder 1 (FIGS. 1, 2 and 3) and an active portion 2. The height h of the outer side surface of the active portion is taken more than ¼ of the diameter d of the active portion 2.

Figure 1:
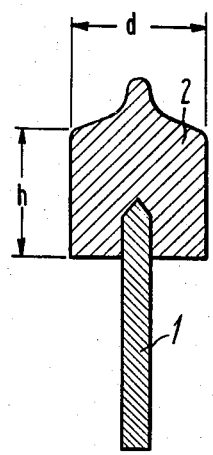

The non-consumable electrode shown in FIG. 1 may be made by pressing the active portion 2 onto the holder 1. In the course of pretreatment of such a non-consumable electrode, the formation of a work surface due to conversion of the material from a liquid phase to a solid one occurs.

The holder 1 may be made of the metals of Groups I, III, IV, V, VI and VIII of the periodic system. For example, the holder may be made of copper, steel, or aluminium for non-consumable electrodes intended for operation at currents from 0.1 to 30 A.

However, the use of said materials to fabricate the holder 1 for non-consumable electrodes of FIG. 1 intended for operation at currents of 100 A and more is not advisable due to the fact that the diameter D of the holder 1 should be substantially increased. In this case the holder 1 should be made of high-melting materials, such as tungsten, molybdenum, and tantalum.

The construction of the non-consumable electrode of FIG. 1 is intended for the use in torches for precision argon-arc welding of thin articles, primarily of the products of electronic and instrument industries, and for welding of articles in a controlled atmosphere of argon, helium, or their mixtures.

Figure 2:
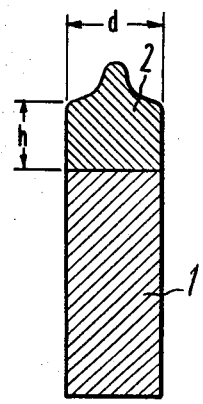

FIG. 2 shows a non-consumable electrode with the diameter of the active portion 2 equal to that of the holder 1. Such a non-consumable electrode provides better heat transfer from the active portion 2 to the holder 1.

The construction of the non-consumable electrode of FIG. 2 is primarily employed for argon-arc welding as well as in gas-discharge apparatus.

Figure 3:
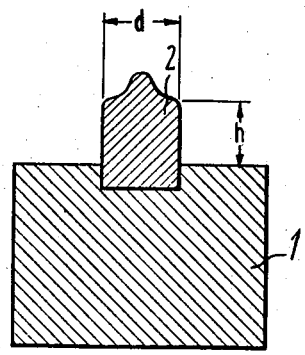

FIG. 3 shows a non-consumable electrode having a recess formed in its holder 1, fixed in which is the active portion 2, its outer side surface being exposed to the height h exceeding ¼ of its diameter d.

Such a construction of the non-consumable electrode is the most efficient one when used in plasmatrons both for microplasma welding and for welding at high currents.

Figure 4:
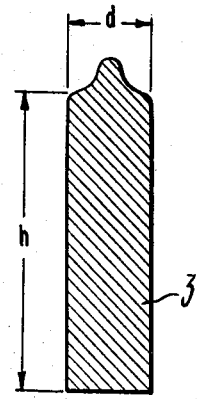

FIG. 4 shows a non-consumable electrode made as a rod 3 of a cylindric shape from an alloy of titanium with rare-earth metals. The active portion of this non-consumable electrode is formed by its end portion contacting with the arc and by the side surface adjacent thereto. The rest of the non-consumable electrode acts essentially as a holder. After the expiry of time defined by the operating life of the non-consumable electrode, the work portion of the electrode should be removed (nipped or cut off) to a length not smaller than ¼ of the diameter. Thereupon, the non-consumable electrode should be again treated in accordance with a method disclosed in Swedish Pat. No. 397,765.

The construction of the non-consumable electrode of FIG. 4 is intended for the use in argon-arc welding of any type, controlled atmosphere welding, plasma welding and in gas-discharge apparatus.

Just before operation, the non-consumable electrodes are pretreated in accordance with a known method consisting in the following: the electrodes are treated under arcing conditions so that the electrode being treated acts as a cathode. During the pretreatment, a mixture of argon with an active gas which forms with one of rare-earth metals and elements of Group IV A and their compounds of the periodic system, compounds with a work function not higher than 3 electron-volts is fed into the cathode drop region of the arc. The time of treatment of the electrode should be at least 100 times shorter than that of operation of the electrode as a cathode of the arc in argon. The electrodes are treated at currents not higher than the upper limit of the range of operating currents, the volume concentration of the active gas in the mixture being from 0.1 to 100% (Cf. Swedish Pat. No. 397,765).

Given below are the examples of tests of the proposed embodiments of a non-consumable electrode.

EXAMPLE 1

| | |
|---|---|
| Holder diameter, D | 1.5 mm |
| Active portion diameter, d | 2.5 mm |
| Height of the exposed outer side surface of the active portion, h | 5 mm |
| Amount of tungsten contained in the powder of which the active portion is made | 85% |
| Amount of yttrium contained in the powder of which the active portion is made | 15% |
| Ratio of the upper value of the range of operating currents to the lower one, $I_{max}/I_{min}$ | 64 |

The tests have shown that the electrode operated in a stable manner within the entire range of operating currents with space localization of the electric arc.

EXAMPLE 2

| | |
|---|---|
| Holder diameter, D | 1.5 mm |
| Active portion diameter, d | 2.5 mm |
| Height of the exposed outer side surface of the active portion, h | 5 mm |
| Amount of tungsten contained in the powder of which the active portion is made | 70% |
| Amount of yttrium contained in the powder of which the active portion is made | 30% |
| Ratio of the upper value of the range of operating currents to the lower one value, $I_{max}/I_{min}$ | 89 |

The tests have shown that the electrode operated in a stable manner within the entire range of operating currents with space localization of the electric arc.

EXAMPLE 3

| | |
|---|---|
| Holder diameter, D | 1.5 mm |
| Active portion diameter, d | 2.5 mm |
| Height of the exposed outer side surface of the active portion, h | 5 mm |
| Amount of tungsten contained in the powder of which the active portion is made | 60% |
| Amount of yttrium contained in the powder of which the active portion is made | 40% |
| Ratio of the upper value of the | |

-continued

| | |
|---|---|
| operating current range to its lower value, $I_{max}/I_{min}$ | 62 |

The tests have shown that the electrode operated in a stable manner with space localization of the electric arc within the entire range of operating currents.

EXAMPLE 4

| | |
|---|---|
| Holder diameter, D | 1.5 mm |
| Active portion diameter, d | 2.5 mm |
| Height of the exposed outer side surface of the active portion, h | 5 mm |
| Amount of tungsten contained in the powder of which the active portion is made | 90% |
| Amount of gadolinium contained in the powder of which the active portion is made | 10% |
| Ratio of the upper value of the operating current range to its lower value, $I_{max}/I_{min}$ | 62 |

The tests have shown that the electrode operated in a stable manner a space localization of the electric arc within the entire range of operating currents.

EXAMPLE 5

| | |
|---|---|
| Holder diameter, D | 1.5 mm |
| Active portion diameter, d | 2.5 mm |
| Height of the exposed outer side surface of the active portion, h | 5 mm |
| Amount of tungsten contained in the powder of which the active portion is made | 80% |
| Amount of gadolinium contained in the powder of which the active portion is made | 20% |
| Ratio of the upper value of the operating current range to its lower value, $I_{max}/I_{min}$ | 93 |

The tests have shown that the electrode operated in a stable manner with space localization of the electric arc within the entire range of operating currents.

EXAMPLE 6

| | |
|---|---|
| Holder diameter, D | 1.5 mm |
| Active portion diameter, d | 2.5 mm |
| Height of the exposed outer side surface of the active portion, h | 5 mm |
| Amount of tungsten contained in the powder of which the active portion is made | 65% |
| Amount of gadolinium contained in the powder of which the active portion is made | 35% |
| Ratio of the upper value of the operating current range to its lower value, $I_{max}/I_{min}$ | 64 |

The tests have shown that the electrode operated in a stable manner with space localization of the electric arc within the entire range of operating currents.

EXAMPLE 7

| | |
|---|---|
| Holder diameter, D | 1.5 mm |
| Active portion diameter, d | 2.5 mm |
| Height of the exposed outer side surface of the active portion, h | 5 mm |
| Amount of tungsten contained in the powder of which the active portion is made | 90% |
| Amount of gadolinium compound contained in the powder of which the active portion is made | 10% |
| Ratio of the upper value of the operating current range to its lower value, $I_{max}/I_{min}$ | 53 |

The tests have shown that the electrode operated in a stable manner with space localization of the electric arc within the entire range of operating currents.

EXAMPLE 8

| | |
|---|---|
| Holder diameter, D | 1.5 mm |
| Active portion diameter, d | 2.5 mm |
| Height of the exposed outer side surface of the active portion, h | 5 mm |
| Amount of tungsten contained in the powder of which the active portion is made | 75% |
| Amount of gadolinium compound contained in the powder of which the active portion is made | 25% |
| Ratio of the upper value of the operating current range to its lower value, $I_{max}/I_{min}$ | 91 |

The tests have shown that the electrode operated in a stable manner with space localization of the electric arc within the entire range of operating currents.

EXAMPLE 9

| | |
|---|---|
| Holder diameter, D | 1.5 mm |
| Active portion diameter, d | 2.5 mm |
| Height of the exposed outer side surface of the active portion, h | 5 mm |
| Amount of tungsten contained in the powder of which the active portion is made | 65% |
| Amount of gadolinium compound contained in the powder of which the active portion is made | 35% |
| Ratio of the upper value of the operating current range to its lower value, $I_{max}/I_{min}$ | 72 |

The tests have shown that the electrode operated in a stable manner with space localization of the electric arc within the entire range of operating currents.

EXAMPLE 10

| | |
|---|---|
| Holder diameter, D | 1.5 mm |
| Active portion diameter, d | 1.5 mm |
| Height of the exposed outer side surface of the active portion, h | 3.5 mm |
| Amount of tungsten contained in the powder of which the active portion is made | 80% |
| Amount of gadolinium contained in the powder of which the active portion is made | 15% |
| Amount of yttrium contained in the powder of which the active portion is made | 5% |
| Ratio of the upper value of the operating current range to its |  |

-continued

| | |
|---|---|
| lower value, $I_{max}/I_{min}$ | 69 |

The tests have shown that the electrode operated in a stable manner with space localization of the electric arc within the whole range of operating currents.

EXAMPLE 11

| | |
|---|---|
| Holder diameter, D | 1.5 mm |
| Active portion diameter, d | 1.5 mm |
| Height of the exposed outer side surface of the active portion, h | 3.5 mm |
| Amount of tungsten contained in the powder of which the active portion is made | 75% |
| Amount of yttrium contained in the powder of which the active portion is made | 10% |
| Amount of gadolinium contained in the powder of which the active portion is made | 15% |
| Ratio of the upper value of the operating current range to its lower value, $I_{max}/I_{min}$ | 71 |

The tests have shown that the electrode operated in a stable manner with space localization of the electric arc within the entire range of operating currents.

EXAMPLE 12

| | |
|---|---|
| Holder diameter, D | 1.5 mm |
| Active portion diameter, d | 2.5 mm |
| Height of the exposed outer side surface of the active portion, h | 5 mm |
| Amount of tungsten contained in the powder of which the active portion is made | 63% |
| Amount of gadolinium compound contained in the powder of which the active portion is made | 30% |
| Amount of yttrium compound contained in the powder of which the active portion is made | 7% |
| Ratio of the upper value of the operating current range to its lower value, $I_{max}/I_{min}$ | 66 |

The tests have shown that the electrode operated in a stable manner with space localization of the electric arc within the whole range of operating currents.

EXAMPLE 13

| | |
|---|---|
| Holder diameter, D | 1.5 mm |
| Active portion diameter, d | 2.5 mm |
| Height of the exposed outer side surface of the active portion, h | 5 mm |
| Amount of tungsten contained in the powder of which the active portion is made | 75% |
| Amount of yttrium contained in the powder of which the active portion is made | 15% |
| Amount of gadolinium contained in the powder of which the active portion is made | 10% |
| Ratio of the upper value of the operating current range to its lower value $I_{max}/I_{min}$ | 69 |

The tests have shown that the electrode operated in a stable manner with space localization of the electric arc within the whole range of operating currents.

EXAMPLE 14

| | |
|---|---|
| Holder diameter, D | 1.5 mm |
| Active portion diameter, d | 2.5 mm |
| Height of the exposed outer side surface of the active portion, h | 5 mm |
| Amount of tungsten contained in the powder of which the active portion is made | 68% |
| Amount of gadolinium compound contained in the powder of which the active portion is made | 20% |
| Amount of yttrium compound contained in the powder of which the active portion is made | 12% |
| Ratio of the upper value of the operating current range to its lower value, $I_{max}/I_{min}$ | 71 |

The tests have shown that the electrode operated in a stable manner with space localization of the electric arc within the entire range of operating currents.

EXAMPLE 15

| | |
|---|---|
| Holder diameter, D | 0.8 mm |
| Active portion diameter, d | 1.5 mm |
| Height of the exposed outer side surface of the active portion, h | 2.5 mm |
| Amount of tungsten contained in the powder of which the active portion is made | 78% |
| Amount of yttrium compound contained in the powder of the active portion is made | 22% |
| Ratio of the upper value of the operating current range to its lower value, $I_{max}/I_{min}$ | 73 |

The tests have shown that the electrode operated in a stable manner with space localization of the electric arc within the entire range of operating currents.

EXAMPLE 16

| | |
|---|---|
| Holder diameter, D | 1.5 mm |
| Active portion diameter, d | 2.5 mm |
| Height of the exposed outer side surface of the active portion, h | 5 mm |
| Amount of tungsten contained in the powder of which the active portion is made | 68% |
| Amount of gadolinium compound contained in the powder of which the active portion is made | 12% |
| Amount of yttrium compound contained in the powder of which the active portion is made | 20% |
| Ratio of the upper value of the operating current range to its lower value, $I_{max}/I_{min}$ | 67 |

The tests have shown that the electrode operated in a stable manner with space localization of the electric arc within the whole range of operating currents.

EXAMPLE 17

| | |
|---|---|
| Holder diameter, D | 0.8 mm |
| Active portion diameter, d | 1.5 mm |

-continued

| | |
|---|---|
| Height of the exposed outer side surface of the active portion, h | 2.5 mm |
| Amount of tungsten contained in the powder of which the active portion is made | 95% |
| Amount of yttrium compound contained in the powder of which the active portion is made | 5% |
| Ratio of the upper value of the operating current range to its lower value, $I_{max}/I_{min}$ | 66 |

The tests have shown that the electrode operated in a stable manner with space localization of the electric arc over the entire range of operating currents.

EXAMPLE 18

| | |
|---|---|
| Holder diameter, D | 1.5 mm |
| Active portion diameter, d | 2.5 mm |
| Height of the exposed outer side surface of the active portion, h | 5 mm |
| Amount of tungsten contained in the powder of which the active portion is made | 60% |
| Amount of yttrium compound contained in the powder of which the active portion is made | 40% |
| Ratio of the upper value of the operating current range to its lower value, $I_{max}/I_{min}$ | 69 |

The tests have shown that the electrode operated in a stable manner with space localization of the electric arc over the whole range of operating currents.

EXAMPLE 19

| | |
|---|---|
| Holder diameter, D | 0.8 mm |
| Active portion diameter, d | 1.5 mm |
| Height of the exposed outer side surface of the active portion, h | 3 mm |
| Amount of titanium contained in the powder of which the active portion of the electrode is made | 98% |
| Amount of cerium contained in the powder of which the active portion of the electrode is made | 2% |
| Minimum operating current | 5.0 A |
| Maximum operating current | 40.0 A |

The tests have shown that the electrode operated in a stable manner for 32 min with space localization of the electric arc over the whole range of operating currents. Arc striking within the whole range of operating currents was faultless.

EXAMPLE 20

| | |
|---|---|
| Holder diameter, D | 1 mm |
| Active portion diameter, d | 2 mm |
| Height of the exposed outer side surface of the active portion, h | 4 mm |
| Amount of titanium contained in the powder of which the active portion of the electrode is made | 99.5% |
| Amount of cerium contained in the powder of which the active portion of the electrode is made | 0.5% |
| Minimum operating current | 0.2 A |
| Maximum operating current | 10.0 A |

The tests have shown that the electrode operated in a stable manner for 40 min under conditions of steady stabilization and space localization of the electric arc within the entire range of operating currents.
Arc striking within the whole range of operating currents was faultless.

EXAMPLE 21

| | |
|---|---|
| Holder diameter, D | 0.8 mm |
| Active portion diameter, d | 1.5 mm |
| Height of the exposed outer side surface of the active portion, h | 3 mm |
| Amount of titanium contained in the powder of which the active portion of the electrode is made | 96% |
| Amount of cerium contained in the active portion of the electrode | 4% |
| Minimum operating current | 5.0 A |
| Maximum operating current | 40.0 A |

The tests have shown that the electrode operated in a stable manner for 25 min with space localization of the electric arc over the whole range of operating currents.
Arc striking within the whole range of operating currents was faultless.

EXAMPLE 22

| | |
|---|---|
| Holder diameter, D | 1 mm |
| Active portion diameter, d | 2 mm |
| Height of the exposed outer side surface of the active portion, h | 4 mm |
| Amount of titanium contained in the powder of which the active portion of the electrode is made | 99.5% |
| Amount of cerium compound contained in the powder of which the active portion of the electrode is made | 0.5% |
| Minimum operating current | 0.3 A |
| Maximum operating current | 10.0 A |

The tests have shown that the electrode operated in a stable manner for 53 min with space localization of the electric arc over the entire range of operating currents.
Arc striking was faultless within the whole range of operating currents.

EXAMPLE 23

| | |
|---|---|
| Holder diameter, D | 1 mm |
| Active portion diameter, d | 2 mm |
| Height of the exposed outer side surface of the active portion, h | 4 mm |
| Amount of titanium contained in the powder of which the active portion of the electrode is made | 95% |
| Amount of cerium compound contained in the powder of which the active portion of the electrode is made | 5% |
| Minimum operating current | 3.0 A |
| Maximum operating current | 20.0 A |

The tests have shown that the electrode operated in a stable manner for 20 min with space localization of the electric arc over the entire range of operating currents.
Arc striking was faultless within the whole range of operating currents.

EXAMPLE 24

| | |
|---|---|
| Holder diameter, D | 1 mm |

-continued

| | |
|---|---|
| Active portion diameter, d | 2 mm |
| Height of the exposed outer side surface of the active portion, h | 4 mm |
| Amount of titanium contained in the powder of which the active portion of the electrode is made | 98% |
| Amount of cerium compound contained in the powder of which the active portion of the electrode is made | 2% |
| Minimum operating current | 5.0 A |
| Maximum operating current | 30.0 A |

The tests have shown that the electrode operated in a stable manner for 40 min with space localization of the electric arc within the whole range of operating currents.

Arc striking was faultless over the entire range of operating currents.

EXAMPLE 25

| | |
|---|---|
| Holder diameter, D | 0.8 mm |
| Active portion diameter, d | 2 mm |
| Height of the exposed outer side surface of the active portion, h | 3 mm |
| Amount of titanium contained in the powder of which the active portion of the electrode is made | 99.0% |
| Amount of gadilinium contained in the powder of which the active portion of the electrode is made | 1.0% |
| Minimum operating current | 0.5 A |
| Maximum operating current | 5.0 A |

The tests have shown that the electrode operated in a stable manner for 32 min with space localization of the electric arc within the entire range of operating currents.

Arc striking was faultless over the whole range of operating currents.

EXAMPLE 26

| | |
|---|---|
| Holder diameter, D | 2 mm |
| Active portion diameter, d | 4 mm |
| Height of the exposed outer side surface of the active portion, h | 6 mm |
| Amount of titanium contained in the powder of which the active portion of the electrode is made | 90% |
| Amount of gadolinium contained in the powder of which the active portion of the electrode is made | 10% |
| Minimum operating current | 50.0 A |
| Maximum operating current | 100.0 A |

The tests have shown that the electrode operated in a stable manner for 29 min with space localization of the electric arc within the entire range of operating currents.

Arc striking over the whole range of operating currents was faultless.

EXAMPLE 27

| | |
|---|---|
| Holder diameter, D | 2 mm |
| Active portion diameter, d | 4 mm |
| Height of the exposed outer side surface of the active portion, h | 6 mm |
| Amount of titanium contained in the powder of which the active portion of the electrode is made | 95% |
| Amount of gadolinium contained in the powder of which the active portion of the electrode is made | 5% |
| Minimum operating current | 5.0 A |
| Maximum operating current | 50.0 A |

The tests have shown that the electrode operated in a stable manner for 35 min with space localization of the electric arc within the whole range of operating currents.

Arc striking was faultless within the entire range of operating currents.

EXAMPLE 28

| | |
|---|---|
| Holder diameter, D | 2 mm |
| Active portion diameter, d | 4 mm |
| Height of the exposed outer side surface of the active portion, h | 6 mm |
| Amount of titanium contained in the powder of which the active portion of the electrode is made | 90% |
| Amount of gadolinium compound contained in the powder of which the active portion of the electrode is made | 10% |
| Minimum operating current | 40.0 A |
| Maximum operating current | 100.0 A |

The tests have shown that the electrode operated in a stable manner for 30 min with space localization of the electric arc within the whole range of operating currents.

Arc striking over the entire range of operating currents was faultless.

EXAMPLE 29

| | |
|---|---|
| Holder diameter, D | 2 mm |
| Active portion diameter, d | 4 mm |
| Height of the exposed outer side surface of the active portion, h | 6 mm |
| Amount of titanium contained in the powder of which the active portion is made | 70% |
| Amount of gadolinium compound contained in the powder of which the active portion of the electrode is made | 30% |
| Minimum operating current | 60.0 A |
| Maximum operating current | 100.0 A |

The tests have shown that the electrode operated in a stable manner for 32 min with space localization of the electric arc within the entire range of operating currents.

Arc striking was faultless within the entire operating current range.

EXAMPLE 30

| | |
|---|---|
| Holder diameter, D | 1 mm |
| Active portion diameter, d | 2 mm |
| Height of the exposed outer side surface of the active portion, h | 4 mm |
| Amount of titanium contained in the powder of which the active portion of the electrode is made | 99% |
| Amount of gadolinium compound contained in the active portion of the electrode | 1% |
| Minimum operating current | 5.0 A |

|  |  |
|---|---|
| Maximum operating current | 45.0 A |

The tests have shown that the electrode operated in a stable manner for 28 min with and space localization of the electric arc within the whole range of operating currents.

Arc striking was faultless within the entire operating current range.

EXAMPLE 31

| | |
|---|---|
| Holder diameter, D | 1 mm |
| Active portion diameter, d | 2 mm |
| Height of the exposed outer side surface of the active portion, h | 4 mm |
| Amount of titanium contained in the powder of which the active portion of the electrode is made | 99.5% |
| Amount of dysprosium compound contained in the powder of which the active portion of the electrode is made | 0.5% |
| Minimum operating current | 0.2 A |
| Maximum operating current | 7.0 A |

The tests have shown that the electrode operated in a stable manner for 50 min within the entire range of operating currents with space localization of the electric arc.

Arc striking was faultless within the entire range of operating currents.

EXAMPLE 32

| | |
|---|---|
| Holder diameter, D | 1 mm |
| Active portion diameter, d | 2 mm |
| Height of the exposed outer side surface of the active portion, h | 4 mm |
| Amount of titanium contained in the powder of which the active portion of the electrode is made | 95% |
| Amount of dysprosium compound contained in the powder of which the active portion of the electrode is made | 5% |
| Minimum operating current | 5.0 A |
| Maximum operating current | 35.0 A |

The tests have shown that the electrode operated in a stable manner for 23 min with space localization of the electric arc within the whole range of operating currents.

Arc striking was faultless over the entire operating current range.

EXAMPLE 33

| | |
|---|---|
| Holder diameter, D | 1 mm |
| Active portion diameter, d | 2 mm |
| Height of the exposed outer side surface of the active portion, h | 4 mm |
| Amount of titanium contained in the powder of which the active portion of the electrode is made | 98% |
| Amount of dysprosium compound contained in the powder of which the active portion of the electrode is made | 2% |
| Minimum operating current | 1.0 A |
| Maximum operating current | 35.0 A |

The tests have shown that the electrode operated in a stable manner for 28 min with space localization of the electric arc within the whole range of operating currents.

Arc striking was faultless within the entire operating current range.

EXAMPLE 34

| | |
|---|---|
| Holder diameter, D | 0.8 mm |
| Active portion diameter, d | 1.5 mm |
| Height of the exposed outer side surface of the active portion, h | 3 mm |
| Amount of titanium contained in the powder of which the active portion of the electrode is made | 99% |
| Amount of neodymium compound contained in the powder of which the active portion of the electrode is made | 1% |
| Minimum operating current | 0.3 A |
| Maximum operating current | 15.0 A |

The tests have shown that the electrode operated in a stable manner for 30 min with space localization of the electric arc within the whole range of operating currents.

Arc striking was faultless within the entire range of operating currents.

EXAMPLE 35

| | |
|---|---|
| Holder diameter, D | 2 mm |
| Active portion diameter, d | 4 mm |
| Height of the exposed outer side surface of the active portion, h | 6 mm |
| Amount of titanium contained in the powder of which the active portion of the electrode is made | 92% |
| Amount of neodymium compound contained in the powder of which the active portion of the electrode is made | 8% |
| Minimum operating current | 10.0 A |
| Maximum operating current | 60.0 A |

The tests have shown that the electrode operated in a stable manner for 22 min with space localization of the electric arc within the whole range of operating currents.

Arc striking was faultless within the entire range of operating currents.

EXAMPLE 36

| | |
|---|---|
| Holder diameter, D | 2 mm |
| Active portion diameter, d | 4 mm |
| Height of the exposed outer side surface of the active portion, h | 6 mm |
| Amount of titanium contained in the powder of which the active portion of the electrode is made | 96% |
| Amount of neodymium compound contained in the powder of which the active portion of the electrode is made | 4% |
| Minimum operating current | 5.0 A |
| Maximum operating current | 45.0 A |

The tests have shown that the electrode operated in a stable manner for 25 min with space localization of the electric arc within the entire range of operating currents.

Arc striking over the entire operating current range was faultless.

EXAMPLE 37

| | |
|---|---|
| Holder diameter, D | 1 mm |
| Active portion diameter, d | 2 mm |
| Height of the exposed outer side surface of the active portion, h | 4 mm |
| Amount of titanium contained in the powder of which the active portion of the electrode is made | 99.5% |
| Amount of terbium compound contained in the powder of which the active portion of the electrode is made | 0.5% |
| Minimum operating current | 0.4 A |
| Maximum operating current | 10.0 A |

The tests have shown that the electrode operated in a stable manner for 15 min with space localization of the electric arc within the entire range of operating currents.

Arc striking within the whole operating current range was faultless.

EXAMPLE 38

| | |
|---|---|
| Holder diameter, D | 1 mm |
| Active portion diameter, d | 2 mm |
| Height of the exposed outer side surface of the active portion, h | 4 mm |
| Amount of titanium contained in the powder of which the active portion of the electrode is made | 98% |
| Amount of terbium compound contained in the powder of which the active portion of the electrode is made | 2% |
| Minimum operating current | 1.0 A |
| Maximum operating current | 15.0 A |

The tests have shown that the electrode operated in a stable manner for 21 min with space localization of the electric arc within the whole range of operating currents.

Arc striking within the whole operating current range was faultless.

EXAMPLE 39

| | |
|---|---|
| Holder diameter, D | 1 mm |
| Active portion diameter, d | 2 mm |
| Height of the exposed outer side surface of the active | 4 mm |
| Amount of titanium contained in the powder of which the active portion of the electrode is made | 95% |
| Amount of terbium compound contained in the powder of which the active portion of the electrode is made | 5% |
| Minimum operating current | 2.0 A |
| Maximum operating current | 20.0 A |

The tests have shown that the electrode operated in a stable manner for 23 min with space localization of the electric arc within the entire range of operating currents.

Arc striking was faultless within the whole operating current range.

EXAMPLE 40

| | |
|---|---|
| Holder diameter, D | 0.8 mm |
| Active portion diameter, d | 1.5 mm |
| Height of the exposed outer side surface of the active portion, h | 3 mm |
| Amount of titanium contained in the powder of which the active portion of the electrode is made | 99.5% |
| Amount of praseodymium compound contained in the powder of which the active portion of the electrode is made | 0.5% |
| Minimum operating current | 0.3 A |
| Maximum operating current | 20.0 A |

The tests have shown that the electrode operated in a stable manner for 35 min with space localization of the electric arc within the entire range of operating currents.

Arc striking was faultless within the whole range of operating currents.

EXAMPLE 41

| | |
|---|---|
| Holder diameter, D | 2 mm |
| Active portion diameter, d | 4 mm |
| Height of the exposed outer side surface of the active portion, h | 6 mm |
| Amount of titanium contained in the powder of which the active portion of the electrode is made | 98% |
| Amount of praseodymium compound contained in the powder of which the active portion of the electrode is made | 2% |
| Minimum operating current | 2.0 A |
| Maximum operating current | 20.0 A |

The tests have shown that the electrode operated in a stable manner for 20 min with space localization of the electric arc within the entire range of operating currents.

Arc striking was faultless within the whole range of operating currents.

EXAMPLE 42

| | |
|---|---|
| Holder diameter, D | 1 mm |
| Active portion diameter, d | 2 mm |
| Height of the exposed outer side surface of the active portion, h | 4 mm |
| Amount of titanium contained in the powder of which the active portion of the electrode is made | 99% |
| Amount of praseodymium compound contained in the powder of which the active portion of the electrode is made | 1% |
| Minimum operating current | 1.0 A |
| Maximum operating current | 25.0 A |

The tests have shown that the electrode operated in a stable manner for 23 min with space localization of the electric arc within the entire range of operating currents.

Arc striking was faultless within the whole range of operating currents.

EXAMPLE 43

| | |
|---|---|
| Holder diameter, D | 2 mm |
| Active portion diameter, d | 2 mm |
| Height of the exposed outer side surface of the active portion, h | 3 mm |
| Amount of titanium contained in the alloy of which the active portion is made | 99.5% |
| Amount of cerium contained in the | |

| | |
|---|---|
| alloy of which the active portion is made | 0.5% |
| Minimum operating current | 5.0 A |
| Maximum operating current | 10.0 A |

The tests have shown that the electrode operated in a stable manner for 60 min with space localization of the electric arc within the entire range of operating currents.

Arc striking was faultless within the whole range of operating currrents.

EXAMPLE 44

| | |
|---|---|
| Holder diameter, D | 2 mm |
| Active portion diameter, d | 2 mm |
| Height of the exposed outer side surface of the active portion, h | 3 mm |
| Amount of titanium contained in the alloy of which the active portion is made | 99.5% |
| Amount of cerium contained in the alloy of which the active portion is made | 0.5% |
| Minimum operating current | 15.0 A |
| Maximum operating current | 40.0 A |

The tests have shown that the electrode operated in a stable manner for 50 min with space localization of the electric arc within the entire range of operating currents.

Arc striking was faultless within the whole operating current range.

EXAMPLE 45

| | |
|---|---|
| Holder diameter, D | 2 mm |
| Active portion diameter, d | 2 mm |
| Height of the exposed outer side surface of the active portion, h | 3 mm |
| Amount of titanium contained in the alloy of which the active portion is made | 98% |
| Amount of cerium contained in the alloy of which the active portion is made | 2% |
| Minimum operating current | 10.0 A |
| Maximum operating current | 30.0 A |

The tests have shown that the electrode operated in a stable manner for 80 min with space localization of the electric arc within the whole range of operating currents.

Arc striking was faultless within the entire operating current range.

EXAMPLE 46

The tests have shown that the electrode operated in a stable manner for 60 min with space localization of the electric arc within the entire range of operating currents.

Arc striking was faultless within the whole operating current range.

EXAMPLE 47

| | |
|---|---|
| Holder diameter, D | 1.5 mm |
| Active portion diameter, d | 3 mm |
| Height of the exposed outer side surface of the active portion, h | 4 mm |
| Amount of titanium contained in the alloy of which the active portion of the electrode is made | 95% |
| Amount of gadolinium contained in the alloy of which the active portion of the electrode is made | 5% |
| Minimum operating current | 50.0 A |
| Maximum operating current | 100.0 A |

The tests have shown that the electrode operated in a stable manner for 50 min with space localization of the electric arc within the whole range of operating currents.

Arc striking was faultless within the entire operating current range.

EXAMPLE 48

| | |
|---|---|
| Holder diameter, D | 1.5 mm |
| Active portion diameter, d | 3 mm |
| Height of the exposed outer side surface of the active potion, h | 4 mm |
| Amount of titanium contained in the alloy of which the active portion of the electrode is made | 90.0% |
| Amount of gadolinium contained in the alloy of which the active portion of the electrode is made | 10.0% |
| Minimum operating current | 50.0 A |
| Maximum operating current | 100.0 A |

The tests have shown that the electrode operated in a stable manner for 45 min with space localization of the electric arc within the whole range of operating currents.

Arc striking within the entire operating current range was faultless.

EXAMPLE 49

| | |
|---|---|
| Holder diameter, D | 2 mm |
| Active portion diameter, d | 2 mm |
| Height of the exposed outer side surface of the active portion, h | 3 mm |
| Amount of titanium contained in the alloy of which the active portion is made | 99.5% |
| Amount of cerium compound contained in the alloy of which the active portion of the electrode is made | 0.5% |
| Minimum operating current | 6.0 A |
| Maximum operating current | 10.0 A |

The tests have shown that the electrode operated in a stable manner for 70 min with space localization of the electric arc within the entire range of operating currents.

Arc striking was faultless within the whole operating current range.

EXAMPLE 50

| | |
|---|---|
| Holder diameter, D | 2 mm |
| Active portion diameter, d | 1 mm |
| Height of the exposed outer side surface of the active portion, h | 3 mm |
| Amount of titanium contained in the alloy of which the active portion of the electrode is made | 98% |
| Amount of cerium compound contained in the alloy of which the active portion of the electrode is made | 2% |

| | |
|---|---|
| Minimum operating current | 10.0 A |
| Maximum operating current | 30.0 A |

The tests have shown that the electrode operated in a stable manner for 80 min with space localization of the electric arc within the entire range of operating currents.

Arc striking was faultless within the whole operating current range.

EXAMPLE 51

| | |
|---|---|
| Holder diameter, D | 2 mm |
| Active portion diameter, d | 1 mm |
| Height of the exposed outer side surface of the active portion, h | 3 mm |
| Amount of titanium contained in the alloy of which the active portion of the electrode is made | 95% |
| Amount of cerium compound contained in the alloy of which the active portion of the electrode is made | 5% |
| Minimum operating current | 8.0 A |
| Maximum operating current | 20.0 A |

The tests have shown that the electrode operated in a stable manner for 60 min with space localization of the electric arc within the whole range of operating currents.

Arc striking was faultless within the entire range of operating currents.

EXAMPLE 52

| | |
|---|---|
| Holder diameter, D | 2 mm |
| Active portion diameter, d | 1 mm |
| Height of the exposed outer side surface of the active portion, h | 3 mm |
| Amount of zirconium contained in the alloy of which the active portion of the electrode is made | 99.5% |
| Amount of gadolinium contained in the alloy of which the active portion of the electrode is made | 0.5% |
| Minimum operating current | 5.0 A |
| Maximum operating current | 15.0 A |

The tests have shown that the electrode operated in a stable manner for 50 min with space localization of the electric arc within the whole range of operating currents.

Arc striking within the entire range of operating currents was faultless.

EXAMPLE 53

| | |
|---|---|
| Holder diameter, D | 1.5 mm |
| Active portion diameter, d | 3 mm |
| Height of the exposed outer side surface of the active portion, h | 4 mm |
| Amount of zirconium contained in the alloy of which the active portion of the electrode is made | 95% |
| Amount of gadolinium contained in the alloy of which the active portion of the electrode is made | 5% |
| Minimum operating current | 50.0 A |
| Maximum operating current | 100.0 A |

The tests have shown that the electrode operated in a stable manner for 40 min with space localization of the electric arc within the whole range of operating currents.

Arc striking was faultless within the entire range of operating currents.

EXAMPLE 54

| | |
|---|---|
| Holder diameter, D | 1.5 mm |
| Active portion diameter, d | 3 mm |
| Height of the exposed outer side surface of the active portion, h | 4 mm |
| Amount of zirconium contained in the alloy of which the active portion of the electrode is made | 90% |
| Amount of gadolinium contained in the alloy of which the active portion of the electrode is made | 10% |
| Minimum operating current | 50.0 A |
| Maximum operating current | 100.0 A |

The tests have shown that the electrode operated in a stable manner for 35 min with space localization of the electric arc within the entire range of operating currents.

Arc striking within the entire range of operating currents was faultless.

EXAMPLE 55

| | |
|---|---|
| Holder diameter, D | 1.5 mm |
| Active portion diameter, d | 2 mm |
| Height of the exposed outer side surface of the active portion, h | 3 mm |
| Amount of zirconium contained in the alloy of which the active portion of the electrode is made | 99.5% |
| Amount of cerium contained in the alloy of which the active portion of the electrode is made | 0.5% |
| Minimum operating current | 5.0 A |
| Maximum operating current | 20.0 A |

The tests have shown that the electrode operated in a stable manner for 40 min with space localization of the electric arc within the entire range of operating currents.

Arc striking was faultless within the whole range of operating currents.

EXAMPLE 56

| | |
|---|---|
| Holder diameter, D | 1.5 mm |
| Active portion diameter, d | 3 mm |
| Height of the exposed outer side surface of the active portion, h | 4 mm |
| Amount of zirconium contained in the alloy of which the active portion of the electrode is made | 95% |
| Amount of cerium contained in the alloy of which the active portion of the electrode is made | 5% |
| Minimum operating current | 40.0 A |
| Maximum operating current | 100.0 A |

The tests have shown that the electrode operated in a stable manner for 45 min with space localization of the electric arc within the entire range of operating currents.

Arc striking was faultless within the entire range of operating currents.

EXAMPLE 57

| | |
|---|---|
| Holder diameter, D | 1.5 mm |
| Active portion diameter, d | 2.5 mm |
| Height of the exposed outer side surface of the active portion, h | 3 mm |
| Amount of zirconium contained in the alloy of which the active portion of the electrode is made | 99.5% |
| Amount of cerium compound contained in the alloy of which the active portion of the electrode is made | 0.5% |
| Minimum operating current | 7.0 A |
| Maximum operating current | 25.0 A |

The tests have shown that the electrode operated in a stable manner for 50 min with space localization of the electric arc within the entire range of operating currents.

Arc striking was faultless within the whole range of operating currents.

EXAMPLE 58

| | |
|---|---|
| Holder diameter, D | 2 mm |
| Active portion diameter, d | 3.5 mm |
| Height of the exposed outer side surface of the active portion, h | 4 mm |
| Amount of zirconium contained in the alloy of which the active portion of the electrode is made | 95% |
| Amount of cerium compound contained in the alloy of which the active portion of the electrode is made | 5% |
| Minimum operating current | 50.0 A |
| Maximum operating current | 120.0 A |

The tests have shown that the electrode operated in a stable manner for 30 min with space localization of the electric arc within the entire range of operating currents.

Arc striking was faultless within the whole operating current range.

EXAMPLE 59

| | |
|---|---|
| Holder diameter, D | 1.5 mm |
| Active portion diameter, d | 3 mm |
| Height of the exposed outer side surface of the active portion, h | 4 mm |
| Amount of zirconium contained in the alloy of which the active portion of the electrode is made | 98% |
| Amount of cerium contained in the alloy of which the active portion of the electrode is made | 2% |
| Minimum operating current | 20.0 A |
| Maximum operating current | 100.0 A |

The tests have shown that the electrode operated in a stable manner for 45 min with space localization of the electric arc within the entire range of operating currents.

Arc striking was faultless within the whole operating current range.

EXAMPLE 60

| | |
|---|---|
| Holder diameter, D | 1.5 mm |
| Active portion diameter, d | 3 mm |
| Height of the exposed outer side surface of the active portion, h | 3 mm |
| Amount of zirconium contained in the alloy of which the active portion of the electrode is made | 98% |
| Amount of cerium compound contained in the alloy of which the active portion of the electrode is made | 2% |
| Minimum operating current | 20.0 A |
| Maximum operating current | 100.0 A |

The tests have shown that the electrode operated in a stable manner for 55 min with space localization of the electric arc within the entire range of operating currents.

Arc striking was faultless within the whole range of operating currents.

EXAMPLE 61

| | |
|---|---|
| Holder diameter, D | 1 mm |
| Active portion diameter, d | 2 mm |
| Height of the exposed outer side surface of the active portion, h | 4 mm |
| Amount of titanium in the powder of which the active portion of the electrode is made | 99.5% |
| Amount of dysprosium in the powder of which the active portion of the electrode is made | 0.5% |
| Minimum operating current | 0.3 A |
| Maximum operating current | 10.0 A |

The tests have shown that the electrode operated in a stable manner for 23 min with space localization the electric arc within the entire range of operating currents.

Arc striking was faultless within the whole operating current range.

EXAMPLE 62

| | |
|---|---|
| Holder diameter, D | 1 mm |
| Active portion diameter, d | 2 mm |
| Height of the exposed outer side surface of the active portion, h | 4 mm |
| Amount of titanium contained in the powder of which the active portion of the electrode is made | 98% |
| Amount of dysprosium contained in the powder of which the active portion of the electrode is made | 2% |
| Minimum operating current | 5.0 A |
| Maximum operating current | 50.0 A |

The tests have shown that the electrode operated in a stable manner for 30 min with space localization of the electric arc within the entire range of operating currents.

Arc striking was faultless within the entire operating current range.

EXAMPLE 63

| | |
|---|---|
| Holder diameter, D | 1 mm |
| Active portion diameter, d | 1.5 mm |
| Height of the exposed outer side surface of the active portion, h | 3 mm |
| Amount of titanium contained in the powder of which the active portion of the electrode is made | 95% |
| Amount of dysprosium contained in the active portion of the electrode | 5% |
| Minimum operating current | 5 A |

The tests have shown that the electrode operated in a stable manner for 25 min with space localization of the electric arc within the entire range of operating currents.

Arc striking was faultless within the whole operating current range.

EXAMPLE 64

| | |
|---|---|
| Holder diameter, D | 1 mm |
| Active portion diameter, d | 4 mm |
| Height of the exposed outer side surface of the active portion, h | 6 mm |
| Amount of titanium contained in the powder of which the active portion of the electrode is made | 99% |
| Amount of neodymium contained in the powder of which the active portion of the electrode is made | 1% |
| Minimum operating current | 2 A |
| Maximum operating current | 15 A |

The tests have shown that the electrode operated in a stable manner for 20 min with space localization of the electric arc within the entire range of operating currents.

Arc striking was faultless within the whole operating current range.

EXAMPLE 65

| | |
|---|---|
| Holder diameter, D | 1 mm |
| Active portion diameter, d | 4 mm |
| Height of the exposed outer side surface of the active portion, h | 6 mm |
| Amount of titanium contained in the powder of which the active portion of the electrode is made | 95% |
| Amount of neodymium contained in the active portion of the electrode | 5% |
| Minimum operating current | 10 A |
| Maximum operating current | 40 A |

The tests have shown that the electrode operated in a stable manner for 25 min with space localization of the electric arc within the entire range of operating currents.

Arc striking was faultless within the whole operating current range.

EXAMPLE 66

| | |
|---|---|
| Holder diameter, D | 1 mm |
| Active portion diameter, d | 4 mm |
| Height of the exposed outer side surface of the active portion, h | 6 mm |
| Amount of titanium contained in the powder of which the active portion of the electrode is made | 92% |
| Amount of neodymium contained in the powder of which the active portion of the electrode is made | 8% |
| Minimum operating current | 5 A |
| Maximum operating current | 50 A |

The tests have shown that the electrode operated in a stable manner for 20 min with space localization of the electric arc within the entire range of operating currents.

Arc striking was faultless within the whole operating current range.

EXAMPLE 67

| | |
|---|---|
| Holder diameter, D | 1 mm |
| Active portion diameter, d | 1.5 mm |
| Height of the exposed outer side surface of the active portion, h | 3 mm |
| Amount of titanium contained in the powder of which the active portion of the electrode is made | 99.5% |
| Amount of praseodymium contained in the powder of which the active portion of the electrode is made | 0.5% |
| Minimum operating current | 2 A |
| Maximum operating current | 20 A |

The tests have shown that the electrode operated in a stable manner for 20 min with space localization of the electric arc within the entire range of operating currents.

Arc striking was faultless within the whole operating current range.

EXAMPLE 68

| | |
|---|---|
| Holder diameter, D | 1 mm |
| Active portion diameter, d | 2 mm |
| Height of the exposed outer side surface of the active portion, h | 3 mm |
| Amount of titanium contained in the powder of which the active portion of the electrode is made | 99% |
| Amount of praseodymium contained in the powder of which the active portion of the electrode is made | 1% |
| Minimum operating current | 1 A |
| Maximum operating current | 20 A |

The tests have shown that the electrode operated in a stable manner for 20 min with space localization of the electric arc within the entire range of operating currents.

Arc striking was faultless within the whole operating current range.

EXAMPLE 69

| | |
|---|---|
| Holder diameter, D | 1 mm |
| Active portion diameter, d | 2 mm |
| Height of the exposed outer side surface of the active portion, h | 3 mm |
| Amount of titanium contained in the powder of which the active portion of the electrode is made | 98% |
| Amount of praseodymium contained in the powder of which the active portion of the electrode is made | 2% |
| Minimum operating current | 1 A |
| Maximum operating current | 20 A |

The tests have shown that the electrode operated in a stable manner for 15 min with space localization of the electric arc within the entire range of operating currents.

Arc striking was faultless within the whole operating current range.

EXAMPLE 70

| | |
|---|---|
| Holder diameter, D | 1 mm |
| Active portion diameter, d | 2 mm |
| Height of the exposed outer side surface of the active portion, h | 4 mm |
| Amount of titanium contained in the powder of which the active portion of the electrode is made | 99.5% |
| Amount of terbium contained in the powder of which the active portion of the electrode is made | 0.5% |
| Minimum operating current | 2 A |
| Maximum operating current | 20 A |

The tests have shown that the electrode operated in a stable manner for 10 min with space localization of the electric arc within the entire range of operating currents.

Arc striking was faultless within the whole operating current range.

EXAMPLE 71

| | |
|---|---|
| Holder diameter, D | 1 mm |
| Active portion diameter, d | 2 mm |
| Height of the exposed outer side surface of the active portion, h | 4 mm |
| Amount of titanium contained in the powder of which the active portion of the electrode is made | 98% |
| Amount of terbium contained in the powder of which the active portion of the electrode is made | 2% |
| Minimum operating current | 2 A |
| Maximum operating current | 30 A |

The tests have shown that the electrode operated in a stable manner for 15 min with space localization of the electric arc within the entire range of operating currents.

Arc striking was faultless within the whole operating current range.

EXAMPLE 72

| | |
|---|---|
| Holder diameter, D | 1 mm |
| Active portion diameter, d | 2 mm |
| Height of the exposed outer side surface of the active portion, h | 4 mm |
| Amount of titanium contained in the powder of which the active portion of the electrode is made | 95% |
| Amount of terbium contained in the powder of which the active portion of the electrode is made | 5% |
| Minimum operating current | 5 A |
| Maximum operating current | 30 A |

The tests have shown that the electrode operated in a stable manner for 12 min with space localization of the electric arc within the entire range of operating currents.

Arc striking was faultless within the whole operating current range. From the specific examples of the embodiments of the present invention considered hereinabove it is readily apparent to those skilled in the art that all the objects of the invention can be accomplished within the scope of the appended claims. But it is also readily apparent that insignificant changes in the construction of the non-consumable electrode can be made without departing from the spirit of the invention. All these changes are considered to be within the spirit and scope of the invention as defined in the claims below.

The proposed non-consumable electrode offers the following advantages:

(1) the cathode voltage drop is reduced 1.5 times in the range of low currents;

(2) the time of electrode operation without changes in the properties of the work surface, causing variations in the arc voltage and disturbance of the stability and space localization of the electric arc, is increased 5 times;

(3) the range of operating currents is extended due to the fact that the minimum value of the operating current is reduced 20 times;

(4) the consumption of tungsten is reduced about 10 times due to the increase of the operating life of the electrode and due to restoration thereof by means of multiple arc treatment in accordance with a method disclosed in Swedish Pat. No. 397,765;

(5) the cost of the non-consumable electrode whose active portion is made of titanium is 3.7 times lower than that of the non-consumable electrode whose active portion is made of tungsten;

(6) the electrode makes it possible to substitute controlled atmosphere welding by argon-arc torch welding, thus providing the same conditions of weld protection;

(7) the electrode provides welding of seams of substantial length, the conditions of weld protection being retained;

(8) the electrode provides welding in rather inaccessible spots with a minimum size of protection devices;

(9) fabricated for operation in rather inaccessible spots are the electrodes of small diameters:

in the range of currents from 0.1 to 10 A–0.5 mm in the range of currents from 2 to 150 A–1 mm if it is required to provide mechanical rigidity of the construction, the electrodes for operation in the ranges from 0.1 to 10 A and from 2 to 150 A may have any diameter, that is 2, 3, 4, 5 mm and more; and

(10) as a result of reduction of the cathode voltage drop, the power source can be simplified due to the decrease of a no-load voltage to 36 v, which improves the efficiency and performance of the non-consumable electrode.

In conclusion it should be noted that from the point of view of a welder the main advantage of the proposed electrode is an exact space localization of the electric arc providing a stable and long operating life of an arc apparatus with a high degree of weld-protection.

What is claimed is:

1. A non-consumable electrode for use in arc and plasma devices in an inert gas atmosphere, made in the form of a cylinder with a tip, comprising: a holder and an active portion, made of a refractory metal with emission admixtures, connected with said holder wherein the outer side surface of the active portion is exposed to a height exceeding ¼ of the diameter thereof, whereby conditions for transfer of the material from the side surface of the active portion to a work surface thereof are provided.

2. A non-consumable electrode according to claim 1, wherein the active portion is made of a powder in which the refractory metal is tungsten in an amount of 60 to 95% by weight and the emission admixtures comprise rare-earth metals.

3. A non-consumable electrode according to claim 1, wherein the active portion is made of a powder in which the refractory metal is tungsten in an amount of 60 to 95% by weight and the emission admixtures comprise rare-earth metal compounds.

4. A non-consumable electrode according to claim 1, wherein the active portion is made of a powder in which the refractory metal is titanium in an amount of 70 to 99.5% by weight and the emission admixtures comprise rare-earth metals.

5. A non-consumable electrode according to claim 1, wherein the active portion is made of a powder in which the refractory metal is titanium in an amount of 70 to 99.5% by weight and the emission admixtures comprise rare-earth metal compounds.

6. A non-consumable electrode according to claim 1, wherein the active portion is an alloy comprising a refractory metal of Group IV A of the periodic system and the emission admixtures comprise rare-earth metals.

7. A non-consumable electrode according to claim 2, wherein the rare-earth metal is yttrium in amounts of 15 to 40% by weight.

8. A non-consumable electrode according to claim 2, wherein the rare-earth metal is gadolinium in amounts of 10 to 35% by weight.

9. A non-consumable electrode of claim 2, wherein the emission admixture comprises yttrium and gadolinium in percent by weight as follows:
yttrium . . . 5–15
gadolinium . . . 10–25.

10. A non-consumable electrode according to claim 3, wherein the rare-earth metal compounds comprise yttrium compounds in amounts of 5 to 40% by weight.

11. A non-consumable electrode according to claim 3, wherein the rare-earth metal compounds comprise gadolinium compounds in amounts of 10 to 35% by weight.

12. A non-consumable electrode according to claim 3, wherein the rare-earth metal compound comprises a mixture of yttrium compounds and gadolinium compounds, the relation between the components in percent by weight being as follows:
yttrium compounds . . . 7–20
gadolinium compounds . . . 12–35.

13. A non-consumable electrode according to claim 4, wherein the rare-earth metal is cerium in amounts of 0.5 to 4% by weight.

14. A non-consumable electrode according to claim 4, wherein the rare-earth metal is dysprosium in amounts of 0.5 to 5% by weight.

15. A non-consumable electrode according to claim 4, wherein the rare-earth metal is gadolinium in amounts of 1 to 10% by weight.

16. A non-consumable electrode according to claim 4, wherein the rare-earth metal is neodymium in amounts of 1 to 8% by weight.

17. A non-consumable electrode according to claim 4, wherein the rare-earth metal is terbium in amounts of 0.5 to 5% by weight.

18. A non-consumable electrode according to claim 5, wherein the rare-earth metal compounds are cerium compounds in amounts of 0.5 to 5% by weight.

19. A non-consumable electrode according to claim 5, wherein the rare-earth metal compounds are dysprosium compounds in amounts of 0.5 to 5% by weight.

20. A non-consumable electrode according to claim 5, wherein the rare-earth metal compounds are gadolinium compounds in amounts of 1 to 30% by weight.

21. A non-consumable electrode according to claim 5, wherein the rare-earth metal compounds are neodymium compounds in amounts of 1 to 8% by weight.

22. A non-consumable electrode according to claim 5, wherein the rare-earth metal compounds are terbium compounds in amounts of 0.5 to 5% by weight.

23. A non-consumable electrode according to claim 6, comprising an alloy containing titanium in amounts of 90 to 99.5% and the rare-earth metal is gadolinium in amounts of 0.5 to 10% by weight.

24. A non-consumable electrode according to claim 6, wherein the alloy comprises titanium in amounts of 95 to 99.5% and the rare-earth metal is cerium in amounts of 0.5 to 5% by weight.

25. A non-consumable electrode according to claim 6, wherein the alloy comprises zirconium in amounts of 90 to 99.5% and the rare-earth metal is gadolinium in amounts of 0.5 to 10% by weight.

26. A non-consumable electrode according to claim 6, wherein the alloy comprises zirconium in amounts of 95 to 99.5% and the rare-earth metal is cerium in amounts of 0.5 to 5% by weight.

27. A non-consumable electrode according to claim 7, wherein the alloy comprises titanium in amounts of 95 to 99.5% and the rare-earth metal compounds are cerium compounds in amounts of 0.5 to 5% by weight.

28. A non-consumable electrode according to claim 7, wherein the alloy comprises zirconium in amounts of 95 to 99.5% and the rare-earth metal compounds are cerium compounds in amounts of 0.5 to 5% by weight.

29. A non-consumable electrode for use in plasma devices in an inert gas atmosphere, made in the form of a cylinder with a tip, comprising: a holder and an active portion, made of an alloy comprising a refractory metal of Group IV A of the periodic system and emission admixtures of rare-earth metal compounds, connected to said holder wherein the outer side surface of the active portion is exposed to a height exceeding ¼ of the diameter thereof.

30. A non-consumable electrode for use in arc and plasma devices in an inert gas atmosphere, made in the form of a cylinder with a tip, comprising: a holder and an active portion, connected to said holder, wherein the outer side surface of the active portion is exposed to a height exceeding ¼ of the diameter thereof, the active portion being made from a refractory metal powder comprising titanium in amounts of 98 to 99.5% and an emission admixture comprising praseodymium in an amount of 0.5 to 2% by weight.

31. A non-consumable electrode for use in arc and plasma devices in an inert gas atmosphere, made in the form of a cylinder with a tip, comprising: a holder and an active portion connected to said holder wherein the outer side surface is exposed to a height exceeding ¼ of the diameter thereof, the active portion being made from a powder of a refractory metal comprising titanium in an amount of 95 to 99.5% by weight and an emission admixture comprising praseodymium compounds in amounts of 0.5 to 2% by weight.

* * * * *